No. 864,369. PATENTED AUG. 27, 1907.
W. J. GRAHAM.
EGG POACHING PAN.
APPLICATION FILED FEB. 24, 1906.
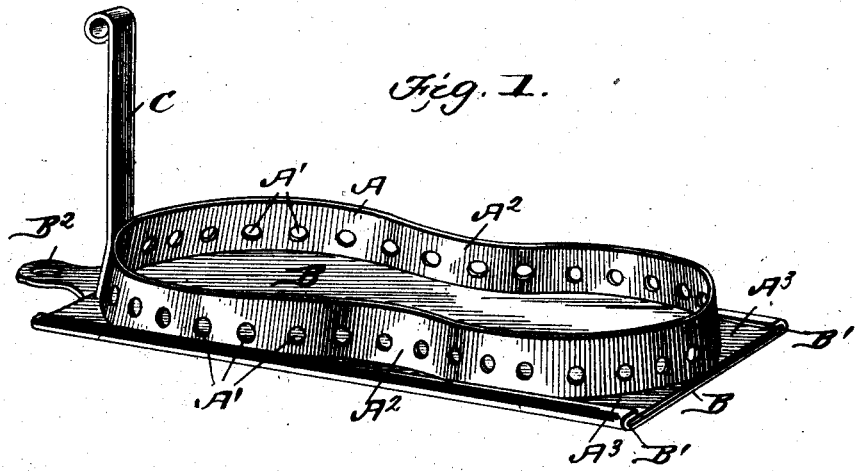
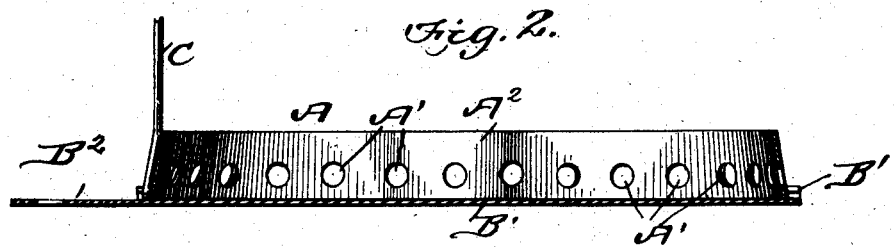
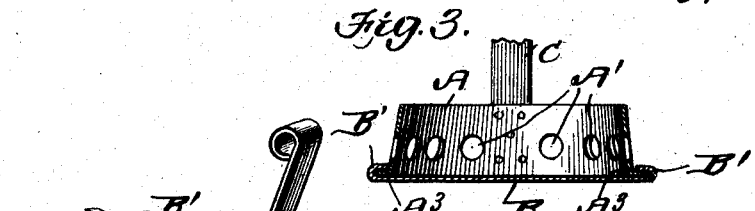
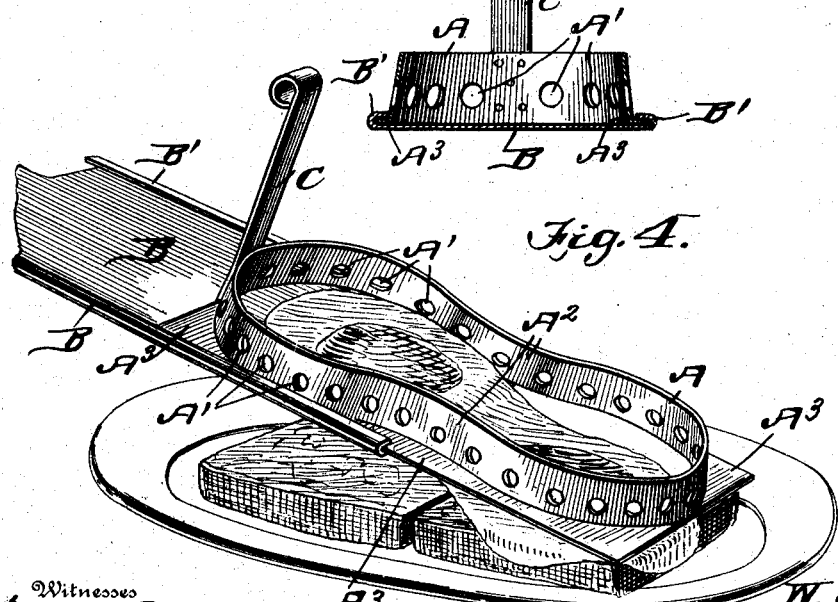
Witnesses
Inventor
W. J. Graham

UNITED STATES PATENT OFFICE.

WILLIAM J. GRAHAM, OF SAVANNAH, GEORGIA.

EGG-POACHING PAN.

No. 864,369.	Specification of Letters Patent.	Patented Aug. 27, 1907.

Application filed February 24, 1906. Serial No. 302,770.

To all whom it may concern:

Be it known that I, WILLIAM J. GRAHAM, a citizen of the United States, residing at Savannah, in the county of Chatham and State of Georgia, have invented a new and useful Improvement in Egg - Poaching Pans, of which the following is a specification.

This invention relates generally to cooking utensils and more particularly to an improved construction of pan for poaching eggs.

In poaching eggs in an ordinary skillet the white of the egg becomes broken or separated and the yolk is correspondingly weakened and frequently breaks. Furthermore great difficulty is always encountered in removing the poached egg from the skillet and arranging it upon the toast or other article upon which it is to rest.

The object of my invention is to provide a pan which can be arranged in an ordinary skillet or receptacle which will prevent the separation of the white during the poaching operation and a still further object is to provide a pan from which the poached egg can be quickly and easily removed and placed upon the toast or other article without breaking the egg in the least and with these objects in view my invention consists in constructing a pan with perforated sides, said sides having outwardly projecting flanges upon which slides the imperforate bottom, said bottom being adapted to be moved away from the sides of the pan for the purpose of depositing or discharging the poached egg.

The invention consists also in certain details of construction hereinafter fully described and pointed out in the claims.

In the drawings forming a part of this specification:—Figure 1 is a perspective view of an egg poaching pan constructed in accordance with my invention. Fig. 2 is a vertical longitudinal sectional view of the same. Fig. 3 is a transverse vertical sectional view. Fig. 4 is a perspective view showing the bottom being removed from the pan and two poached eggs being deposited upon pieces of toast arranged within an ordinary dish.

In constructing a pan in accordance with my invention I employ the sides A having perforations A', said sides being constructed of a continuous strip of ordinary tin or sheet metal inclined outwardly from the top to the bottom edges and the sides are preferably made in the form of an ellipse, the side edge being preferably pressed inward as shown at $A^2$ thereby adapting the pan for poaching two eggs at the same time. The sides are formed at their lower edges with the laterally projecting flanges $A^3$, the outer edges of which are straight. These flanges $A^3$ may be integral with the perforated sides or they may be made separate and connected thereto by soldering or otherwise.

B indicates the imperforate bottom the side edges of said bottom being turned over as shown to provide grooved guideways B' which fit over and slide upon the laterally projecting flanges $A^3$. The sliding bottom is provided with a handle $B^2$ at one end of the perforated side of the pan and the perforated side of the pan is provided with a handle C at one end by means of which the entire pan can be lifted as shown in Fig. 3 for the purpose of withdrawing the bottom when it is desired to deposit the poached egg.

In operation the pan with the parts arranged as shown in Fig. 1 is arranged in an ordinary skillet or other receptacle containing boiling water of a depth sufficient to reach the top of the pan. The eggs to be poached are then broken in the pan and the sides being perforated there will be free circulation of the water through the pan. The imperforate bottom however, will prevent the agitation of the boiling water at the bottom of the skillet from breaking the egg and inasmuch as the entire egg will be contained within the perforated inclosure all danger of the white of the egg breaking up will be prevented. After the egg has been thoroughly poached the pan with the egg therein can be removed from the skillet or other receptacle by means of the handle C and in order to deposit the egg it is only necessary to slide the bottom from beneath the sides and the egg will drop upon the toast or other article upon which it is to be placed.

Having thus fully described my invention what I claim as new and desire to secure by Letters Patent is:—

1. An egg poaching pan comprising the perforated sides essentially elliptical in shape and provided with laterally projecting flanges, the edges of which are straight, an imperforate bottom having grooved guideways at the side edges, said bottom having a handle at one end and a handle connected to the side of the pan at one end.

2. An egg poaching pan comprising the inclined perforated continuous sides essentially elliptical in shape and provided with laterally projecting flanges, the edges of which are straight, said sides being bent towards each other centrally of their length, a solid bottom having upwardly and inwardly bent side edges forming grooved guide ways, said guideways being adapted to embrace and slide upon said laterally projecting flanges of said sides, substantially as described.

WILLIAM J. GRAHAM.

Witnesses:
 ISAAC R. NATHANS,
 MORDECAI SHEFTALL.